Patented Dec. 12, 1944

2,365,123

UNITED STATES PATENT OFFICE 2,365,123

REFINING OF COUMARONE-INDENE RESINS

William N. Traylor, Hattiesburg, Miss., assignor to Hercules Powder Company, Wilmington, Del., a corporation of Delaware No Drawing. Application April 18, 1941, Serial No. 389,176

12 Claims. (Cl. 260—81)

This invention relates to coumarone-indene resins, and more particularly to a process for refining coumarone-indene resins.

Coumarone-indene resins are generally prepared from certain coal tar fractions, and may vary in color and other properties depending on the degree of purification, and boiling range of the coal tar fraction containing the coumarone and indene or on the method of polymerization of the coumarone-indene. The preparation of light colored coumarone-indene resins has been difficult and expensive. Thus, prior processes for producing the more valuble pale colored coumarone-indene resins are concerned with expensive fractionation and purification of the raw materials, or involve expensive adsorption processes or hydrogenation processes. These usually result in reduced yield of refined resin or may be applicable only to resins from specific sources.

It is an object of this invention to provide an improved process for refining coumarone-indene resins.

It is a further object of this invention to provide an improved process for refining coumarone-indene resins which is extremely simple and economical.

It is a further object of this invention to provide a process for refining coumarone-indene resins which results in a substantially quantitative yield of refined resin.

It is a still further object of this invention to provide an improved process for refining coumarone-indene resins which is applicable to a wide variety of coumarone-indene resin types.

Other objects of the invention will appear hereinafter.

The objects of this invention are in general accomplished by treating the coumarone-indene resins under ionizing conditions with an acid salt and a metal above hydrogen in the electromotive series. The treatment is carried out under conditions which will provide intimate contact between the coumarine-indene resins and the acid salt and the metal. As a result, the color of the coumarone-indene resins is substantially lightened with practically no loss in yield and no perceptible effect on the other properties of the coumarone-indene resins.

In accordance with the process of this invention the treatment may be carried out on the coumarone-indene resins in the molten condition or on the resins dissolved in a suitable solvent. After the treatment of the coumarone-indene resins is completed, the resins or their solution may be washed to remove any water-soluble material and filtered to remove any suspended matter. If desired, the solution may be filtered prior to the water washing step. In the case of treatment of the coumarone-indene resins in solution, the resins of improved color may then be recovered by evaporation of the solution.

The process of this invention is applicable to coumarone-indene resins from any source. Thus commercial coumarone-indene resins prepared by polymerizing solvent naphthas are applicable, or the resins prepared from coal tar fractions comprising the low order polymers of coumarone and indene may be used. The process is likewise applicable to coumarone-indene resins prepared by different methods of polymerization, such as polymerization with sulfuric acid, or with metal halides or by heat and pressure, or by polymerization in different solvents, etc. In general, however, the greatest improvement in color is obtained when my process is employed on the relatively dark colored and impure resins. The refining treatment may be applied desirably to the resin immediately after its preparation. The decolorizing effect on the extremely pale resins is less noticeable since any handling of such resins at higher temperatures also has a tendency to darken the resins unless extensive precautions are taken to preclude contact with air or other discoloring chemicals.

As solvents for the coumarone-indene resins when the treatment is carried out on the resins in solution, any solvent for the resins may be employed which is itself inert in the treatment. Among such solvents are, for example, monocyclic aromatic hydrocarbons such as benzene, toluene, xylene, etc.; petroleum hydrocarbons, such as, gasoline, V. M. & P. naphtha, hexane, heptane, etc.; hydrogenated petroleum hydrocarbons, such as those known in the trade as "Solvesso" solvents; turpentine, terpenes and solvents such as ethylene dichloride, carbon tetrachloride, dichloroethyl ether, p-menthane, tetrahydro and decahydronaphthalenes, cyclohexane, methyl cyclohexane, etc. Where the treatment is carried out on the coumarone-indene resins in solution, the concentration of the resin in solution is not critical and may be selected to provide adequate workability of the solution. In general, a concentration within the range of about 10% to 75% by weight may be used, but preferably the concentration is held within the range of 30% to 50% by weight.

The acid salts which may be used in the process of this invention are those which contain one or more replaceable hydrogen atoms, such as, for example, sodium acid sulfate, potassium acid sulfate, monosodium acid phosphate, disodium acid phosphate, monopotassium acid phosphate, dipotassium acid phosphate, calcium acid phosphate, lithium acid phosphate, etc.

Any of the metals above hydrogen in the electromotive series may be employed. It will be preferable, however, to use such metals which form salts having no appreciable discoloring effect on the coumarone-indene resin. The metals are used preferably, though not necessarily, in a finely divided form. Use of metals as, for example, cadmium, aluminum, magnesium, tin and zinc is desirable. Zinc in the form of zinc dust, mossy zinc or zinc powder is particularly well adapted to the process.

In order to produce the necessary refining action, the metal and acid salt should be contacted with the resin during the refining process under ionizing conditions. By ionizing conditions is meant conditions under which the acid salt and metal may dissociate, as in the presence of an ionizing solvent such as water. It is, therefore, desirable that at least a small amount of water or some other ionizing solvent be present in order that such ionizing conditions are realized. Thus, the acid salt may be used in the form of a hydrate if it forms one, or in the form of an aqueous solution. Sodium acid sulfate in the form of its monohydrate is particularly desirable. Alternatively, a small amount of water or other ionizing solvent may be added. An aqueous solution containing from about 20% of the acid salt to a saturated solution of the salt at the temperature employed may be used.

It will be understood that the acid salt and the metal above hydrogen in the electromotive series are both in contact with the coumarone-indene resin during the treatment. To provide satisfactory contact of the acid salt and metal with the coumarone-indene resin, it will be desirable to employ vigorous agitation since the refining action will be appreciably accelerated thereby.

The speed with which the coumarone-indene resins become refined is also dependent on the temperature employed in the treatment. While the treatment may be carried out at room temperature with the coumarone-indene resins dissolved in a suitable solvent, the rate of refining is slow for practical purposes. It is preferable to carry out the treatment at elevated temperatures, and temperatures as high as 200° C. have been satisfactory although higher temperatures are possible. A temperature within the range of about 70° C. to about 125° C. is preferable. When carrying out the treatment of the coumarone-indene resins in solution, it is convenient to carry out the treatment at the reflux temperature of the solvent. Where the treatment is to be carried out above the normal boiling point of the solvent, use of superatmospheric pressure is resorted to. The pressures employed are in no way limiting on the process, and the equipment employed will generally determine the maximum pressure which is practical.

The time of treatment of the coumarone-indene resins may be varied to produce the result desired. The time necessary to provide satisfactory refining of the resins will be dependent on such factors as the amount of color bodies present in the resin, the temperature of treatment, the amount of acid salt employed and other factors. For this reason it is impossible to state any definite time necessary except in relation to a given set of conditions. Under usual conditions reaction times between about 10 minutes and 5 hours may be satisfactory, although depending on specific conditions longer or shorter contact times are entirely possible.

The amount of acid salt used may vary over a wide range depending on factors such as the particular acid salt used, the degree of refining desired, the particular conditions of treatment, as well as other factors. Considering the acid salt on an anhydrous basis, for example, ratios of coumarone-indene resin to the acid salt of as high as 40 to 1 on a weight basis are practical. In general, however, ratios varying between 10 of resin to 1 of acid salt down to 1 of resin to 1 or more of acid salt are desirable. A preferred ratio is approximately 1 of acid salt to 3 of coumarone-indene resin.

The amount of metal above hydrogen in the electromotive series used is not particularly critical. It will be desirable, however, to have an amount of such metal present which will be an excess over the theoretical amount required to react with the acid salt present.

The process of refining coumarone-indene resins in accordance with this invention may also be carried out as a continuous process if desired. Thus, for example, the coumarone-indene resin solution may be treated with the metal above hydrogen in the electromotive series and the acid salt in a suitable vessel while additional coumarone-indene resin solution is fed into the vessel continuously and refined coumarone-indene resin solution is withdrawn from the vessel at substantially the same rate. The acid salt and metal may be replenished as necessary and the refined solution passed to a continuous evaporator for removal of the solvent.

The use of an inert atmosphere such as provided by nitrogen, hydrogen, carbon dioxide, etc. during the various refining steps is often of assistance in obtaining pale colored products. This may be particularly helpful during washing of treated coumarone-indene resin solutions or in the evaporation of solvents therefrom.

As illustrative of the improved process of refining coumarone-indene resins in accordance with this invention, the examples appearing below are cited as typical of the various embodiments. The colors shown in the examples are the Lovibond glass colors measured on ⅞" cubes of the resins, or are the colors corresponding to the Standard U. S. Rosin Type.

EXAMPLE 1

A coumarone-indene resin was prepared as follows. Fifteen parts by weight of 95% $H_2SO_4$ was added dropwise over a five-minute period of time to 300 parts by weight of a vacuum distilled, 65% polymerizable coumarone-indene fraction at 10° C. and with agitation of the mixture. The temperature rose to 100° C. for 3 minutes, the mixture was cooled to 20° C. and agitation continued for 15 minutes. The reaction mixture was dissolved in xylene, washed once with 450 parts by weight of aqueous 30% NaOH, then with water. The solvent and unreacted constituents were removed by vacuum distillation, leaving 205 parts by weight of solid resin of Drop M. P. 102° C., and color D.

Seventy-five parts by weight of this resin were dissolved in 310 parts by weight of benzene. This solution was refluxed for one hour with a mixture of 15 parts by weight of zinc powder and 23 parts by weight of NaHSO₄·H₂O. The solution was decanted, filtered, water washed and the solvent evaporated under vacuum. The drop melting point of the refined coumarone-indene resin was 103° C. and the color I+.

EXAMPLE 2

Seventy-five parts by weight of a commercial coumarone-indene resin was dissolved in 310 parts by weight of benzene and refluxed for one hour with 15 parts by weight of zinc powder, and 23 parts by weight of NaHSO₄·H₂O. The solution was decanted, filtered, water washed and the solvent evaporated under vacuum. The resin was refined from a color I to I+ or as measured on the Lovibond color scale from 80 Amber plus 0.25 Red to 65 Amber.

EXAMPLE 3

Sixty parts by weight of a commercial coumarone-indene resin was dissolved in 190 parts by weight of benzene and refluxed for one hour with 20 parts by weight of zinc and 30 parts by weight of NaHSO₄·H₂O. The solution was decanted, filtered, water washed and the resin recovered as in Example 2. This experiment was duplicated, except that prior to treatment with the Zn-NaHSO₄ mixture, the benzene solution of the resin was shaken with an equal volume of 50% H₂SO₄. The H₂SO₄ was separated before treatment with the Zn-NaHSO₄ mixture. The effect of the treatments is shown below:

|  | Color | |
|---|---|---|
|  | U. S. Standard Rosin Type | Lovibond |
| Original resin | Darker than D. | Darker than 80 Amber+140 Red. |
| Treated resin (without aqueous H₂SO₄ treatment). | E+ | 80 Amber+35 Red. |
| Treated resin (prior aqueous H₂SO₄ treatment). | F | 80 Amber+20 Red. |

EXAMPLE 4

A commercial coumarone-indene resin of very dark brown-black color was pre-treated with 50% H₂SO₄, the sulfuric acid removed and the resin treated with zinc-sodium acid sulfate as in Example 3. The color was improved to an E grade or a color of 80 Amber+50 Red on the Lovibond scale.

EXAMPLE 5

Solutions of a commercial coumarone-indene resin of a color of D were separately refluxed with a series of suitable metals and acid salts for one hour. The treated solutions were water washed, filtered, and the solvent removed under vacuum. The particular refining agents used and the results of the process are tabulated below:

*Parts by weight*

| Solvent | Resin | Metal | Acid salt | Color refined resin |
|---|---|---|---|---|
| Benzene (190) | (60) | Zn-(20) | NaHSO₄·H₂O (30) | M |
| Do | (60) | Sn (20) | do | H |
| Do | (60) | Zn-(20) | NaH₂PO₄·H₂O (30) | I |
| Ethylene dichloride (190) | (60) | Sn-(20) | 50% aqueous NaH₂PO₄ (60) | H |
| Benzene (190) | (60) | Zn-(20) | 40% aqueous K₂HPO₄ (90) | H |

It is to be understood that the term "refining" used throughout this invention refers particularly to the color improvement of the resin and not necessarily to a separation of the resin into light-colored and dark-colored fractions.

It will also be understood that the details and examples hereinbefore set forth are illustrative only, and that the invention as broadly described and claimed is in no way limited thereby.

What I claim and desire to protect by Letters Patent is:

1. A process for refining a coumarone-indene resin which comprises treating said coumarone-indene resin with a metal above hydrogen in the electromotive series and an acid salt of a polybasic inorganic acid selected from the group consisting of sulfuric acid and phosphoric acid in the presence of at least a small amount of water.

2. A process for refining a coumarone-indene resin which comprises treating said coumarone-indene resin dissolved in a suitable solvent with a metal above hydrogen in the electromotive series and an acid salt of a polybasic inorganic acid selected from the group consisting of sulfuric acid and phosphoric acid in the presence of at least a small amount of water.

3. A process for refining a coumarone-indene resin which comprises heating said coumarone-indene resin dissolved in a suitable solvent with a metal above hydrogen in the electromotive series and an acid salt of a polybasic inorganic acid selected from the group consisting of sulfuric acid and phosphoric acid in the presence of at least a small amount of water.

4. A process for refining a coumarone-indene resin which comprises treating said coumarone-indene resin dissolved in a suitable solvent with zinc and an acid salt of a polybasic inorganic acid selected from the group consisting of sulfuric acid and phosphoric acid in the presence of at least a small amount of water.

5. A process for refining a coumarone-indene resin which comprises treating said coumarone-indene resin dissolved in a suitable solvent with zinc and a hydrate of sodium acid sulfate in the presence of at least a small amount of water.

6. A process for refining a coumarone-indene resin which comprises treating said coumarone-indene resin dissolved in a suitable solvent with zinc and sodium acid sulfate monohydrate in the presence of at least a small amount of water.

7. A process for refining a coumarone-indene resin which comprises treating said coumarone-indene resin dissolved in a suitable solvent with zinc and an aqueous solution of sodium acid sulfate.

8. A process for refining a coumarone-indene resin which comprises heating said coumarone-indene resin dissolved in a suitable solvent with a metal above hydrogen in the electromotive series and an acid salt of a polybasic inorganic acid selected from the group consisting of sulfuric acid and phosphoric acid in the presence of at least a small amount of water and at a temperature within the range of about 70° to about 125° C.

9. A process for refining a coumarone-indene resin which comprises heating said coumarone-indene resin with sodium acid sulfate and zinc in the presence of at least a small amount of water and at a temperature within the range of about 70° to about 125° C.

10. A process for refining a coumarone-indene resin which comprises heating said coumarone-indene resin with sodium acid sulfate monohydrate and zinc in the presence of at least a small amount of water and at a temperature within the range of about 70° to about 125° C.

11. A process for refining a coumarone-indene resin which comprises heating said coumarone-indene resin dissolved in a suitable solvent with a metal above hydrogen in the electromotive series and an acid salt of a polybasic inorganic acid selected from the group consisting of sulfuric acid and phosphoric acid in the presence of at least a small amount of water, washing the solution to remove water-soluble products, filtering the solution, and recovering a refined coumarone-indene resin from the solution.

12. A process for refining a coumarone-indene resin which comprises heating said coumarone-indene resin dissolved in a suitable solvent with sodium acid sulfate and zinc in the presence of at least a small amount of water, washing the solution to remove water-soluble products, filtering the solution, and recovering a refined coumarone-indene resin from the solution.

WILLIAM N. TRAYLOR.